Oct. 13, 1970 W. MOLLER 3,533,579
AIRCRAFT SPEED CONTROLLER
Filed June 21, 1967 3 Sheets-Sheet 1

INVENTOR.
WALDEMAR MOLLER

INVENTOR.
WALDEMAR MOLLER

INVENTOR.

WALDEMAR MOLLER

United States Patent Office
3,533,579
Patented Oct. 13, 1970

3,533,579
AIRCRAFT SPEED CONTROLLER
Waldemar Moller, Heiligenberg, Germany, assignor to Bodenseewerk Geraetetechnik G.m.b.H., Ueberlingen (Bodensee), Germany, a corporation of Germany
Filed June 21, 1967, Ser. No. 647,739
Claims priority, application Germany, June 29, 1966,
F 49,575
Int. Cl. B64c *13/18;* B64d *31/08*
U.S. Cl. 244—77                                        11 Claims

ABSTRACT OF THE DISCLOSURE

An aircraft includes airspeed control means for automatically varying the fuel flow rate to propulsive units. The fuel flow rate is varied in response to an input error control signal which is representative of deviations in airspeed from a preselected value. An automatic pilot is provided for maintaining a preselected flight path for the aircraft. Means provide and apply to the airspeed control means, a corrective signal corresponding to the acceleration of the aircraft in the direction of its yaw axis. With this arrangement, a change in aircraft flight path thereby causes the application of a speed control signal to the speed control means while avoiding traversal of the intercoupled loops formed by the airspeed control means and tthe automatic pilot.

The present invention relates to a speed controlling means for aircraft. The invention relates more particularly to speed controlling means of the type wherein the fuel supply to propulsive units of the aircraft is controlled in accordance with air speed.

The air speed of an aircraft is controlled by means of a gas throttle operated by the human pilot or by a speed controller. The flight path control of the aircraft is accomplished independently and is effected in a vertical direction by adjustment of the elevator either by the human pilot or by an automatic pilot. Difficulties are encountered, particularly in aircraft having propulsive units mounted a relatively large distance below the aircraft center of gravity. The Boeing Jet propelled aircraft Model 707 is an aircraft of this type. A change in thrust causes relatively large torques about the pitch axis. Thus an increase in thrust causes a bucking of the aircraft, and a resulting change in flight path. The increased engine power is then consumed as climb power and does not result in an increase in speed. On the contrary, a decrease in speed may even occur. This path deviation is then corrected by the human pilot or the automatic pilot by means of the elevator. On the other hand, by actuating the elevator, a change in speed is effected simultaneously by the conversion of potential energy into kinetic energy, or vice versa. If the aircraft climbs after actuation of the elevator so as to correct a path deviation downwardly, then there will be a conversion of kinetic energy into potential energy, resulting in a reduction in speed. Thus, the control loops for thrust (speed) and path are interrelated.

This form of aircraft includes an automatic speed controller loop for maintaining a substantially constant airspeed and an automatic pilot control loop for maintaining a pre-established flight path. These speed and flight path control loops form with the aircraft itself an intercoupled control loop. The occurrence of a path deviation requires a traversal of this entire intercoupled loop to effect a desired correction. Since the control loop elements are subject to time lags, an undesired hunting of the aircraft flight path about the desired flight path and the airspeed about a pre-established value of airspeed occurs.

It is an object of the present invention to provide an improved speed control and flight path control for an aircraft.

Another object of the invention is to provide a speed-flight path control of the type described having decoupling of the intercoupled control loop.

In accordance with features of the present invention, an aircraft includes an airspeed control means for automatically varying the fuel flow rate to propulsive units thereof. The fuel flow rate is varied in response to an input error control signal which is representative of deviations in airspeed from a preselected value. An automatic pilot is provided for maintaining a preselected flight path for the aircraft. Means provide and apply to the airspeed control means, a corrective signal corresponding to the acceleration of the aircraft in the direction of its yaw axis. With this arrangement, a change in aircraft flight path thereby causes the application of a speed control signal to the speed control means while avoiding traversal of the intercoupled control loops formed by the airspeed control means and the automatic pilot. Hunting is thereby substantially reduced.

These and other objects and features of the invention will be apparent with reference to the specifications and accompanying drawings wherein.

Figure 1:
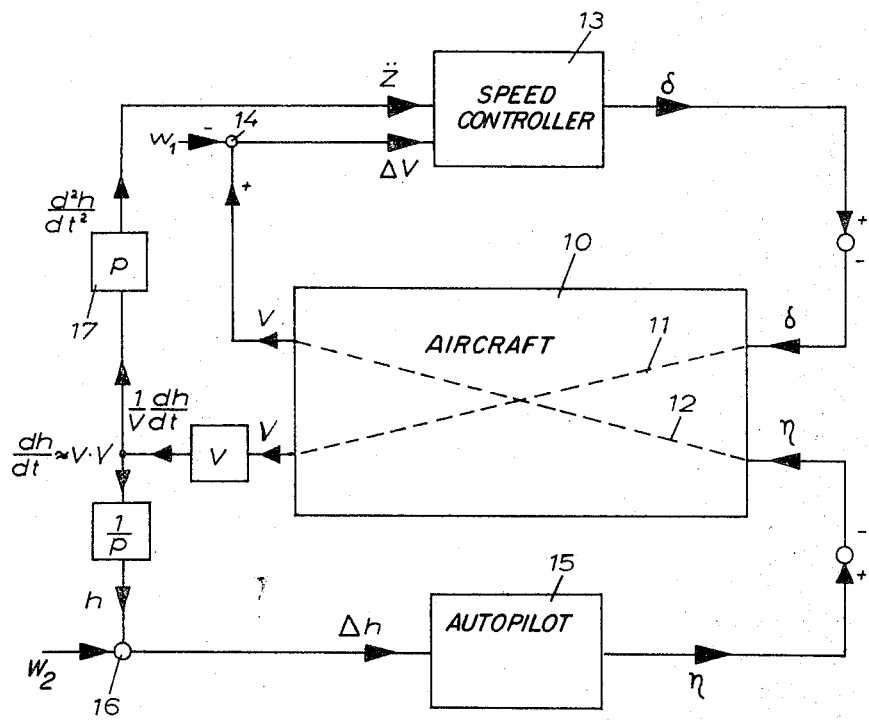
FIG. 1 is a diagram in block form illustrating the speed control and automatic pilot control means for an aircraft.
Figure 3:
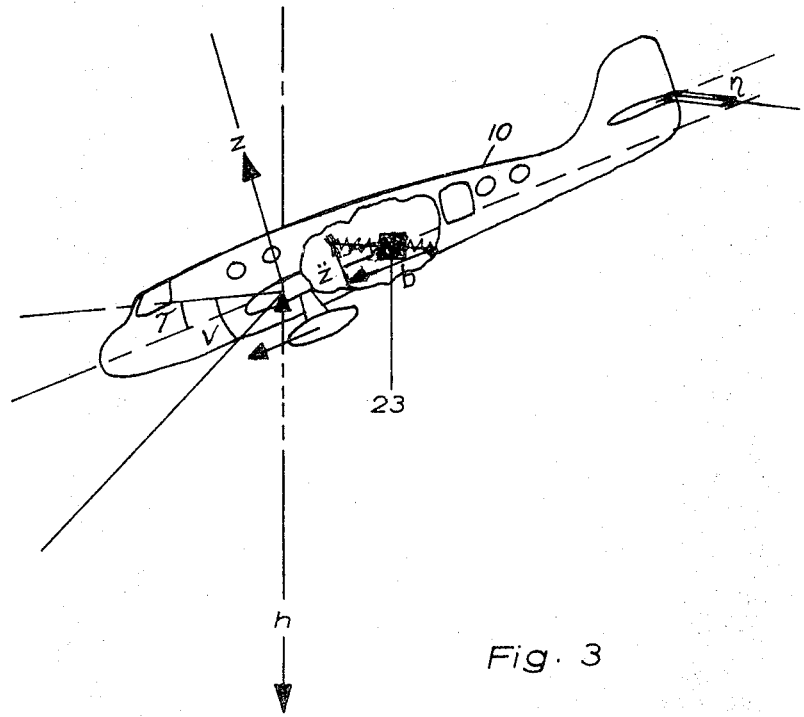
FIG. 3 is a schematic partly cut away side view of an aircraft.
Figure 4:
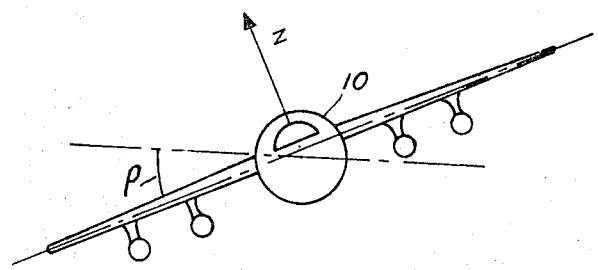
FIG. 4 is a schematic front view of an aircraft.

In order that the features of the present invention may be fully appreciated, the interdependence of the speed control and flight path control loops will be considered initially. The interdependence is illustrated in FIG. 1, wherein the aircraft 10 of FIGS. 3 and 4 is represented by the rectangle 10. The control inputs to the aircraft are $\delta$ representing the angular position of the pilot's throttle lever, and $\eta$ representing the angular deflection of the elevator. The aircraft responds thereto with a specific air speed $v$ and a path angle $\gamma$ where $$\gamma = \frac{1}{v}\frac{dh}{dt}$$

and where $h$ is the altitude. The characteristics of the aircraft 10 are such that a change of $\delta$ primarily acts on the path angle indicated as the broken line 11 in FIG. 1, while an adjustment of the elevator angular deflection $\eta$, influences the air speed $v$ indicated as the broken line 12. Of course, a change of $\delta$ also has an effect of $v$ and, a change of $\eta$, also on $\gamma$. In addition, a distinction must be made be-also on $\gamma$. In addition, a distinction must be made between dynamic and static response. Conditions are quite complicated in practice. The representation of FIG. 1 can only illustrate these conditions in highly simplified manner. Statically, a change of $\delta$ has a smaller effect on the air speed than a change of $\eta$.

The error $\Delta v$ in the air speed $v$ from a pre-established value comprises the input to a speed controller 13. The speed $v$ is preferably determined from the velocity head and is connected in opposition to a pre-established control value $w_1$ as at 14. When the air speed deviates from the value $w_1$ the throttle lever is adjusted and $\delta$ is changed. A path deviation $h$ is converted into a movement of the elevator by the pilot or the automatic pilot 15, and thus into a change of $\eta$. A pre-established path value $w_2$ is connected in opposition to the path actual value $h$ as indicated at 16. In a landing approach, the value $w_2$ can be the constantly changing altitude of the glide path.

The actual path value may, for instance, be obtained from a glide slope beam.

If a deviation in flight path and thus a variation in $h$ occurs, as for example when the aircraft is forced by a region of downward air currents to deviate from its specified gliding path, then the pilot or automatic pilot 15 becomes operative to actuate the elevator. The aircraft climbs or reduces its rate of descent in a manner for correcting this deviation. The air speed decreases and this results in an error at the speed controller. The speed controller increases the thrust which again leads to a climb of the aircraft. Thus, in the case of a path deviation, the whole control loop is intercoupled so as to be a figure "8"-shaped, and must be traversed. Since all control loop elements are subjected to time delay or lags, a hunting both of the path about the desired gliding path and of the air speed about the pre-established value $w_1$ results.

In avoiding this undesirable hunting and in accordance with a feature of this invention a signal corresponding to the acceleration in the direction of the aircraft yaw axis is applied to the speed control. When a path deviation occurs then, a change of $\gamma$ occurs, and a $$\left[\frac{d^2h}{dt^2}\right]$$

signal will be produced which is directly applied to the input of the speed controller. In previous arrangements, an input signal was applied to the speed controller after a correction of a path deviation by the elevator and a change in the air speed had occurred. With the control arrangement of the present invention, the speed controller operates immediately as a change in the gliding angle occurs and provides a double effect: A torque is applied to the aircraft so that the aircraft changes over to climb or flatter descent and corrects the path deviation. In addition, by the increase and decrease respectively in thrust, the loss and gain respectively of kinetic energy occurring therewith is balanced so that the air speed remains substantially constant. As a result, the pilot or automatic pilot operation of the elevator need practically not come into action at all. Thus, it will not be necessary to traverse the lower loop of the figure "8" and of FIG. 1, and glide path and air speed hunting is thereby substantially avoided.

In co-pending U.S. patent application Ser. No. 647,738, filed June 21, 1967, now Pat. No. 3,448,948, and which is assigned to the assignee of the present invention, it is proposed to superimpose a signal derived from a longitudinal accelerometer on a signal dependent on the error $\Delta v$ of the speed with respect to air in order to provide gust compensation. The present invention may very simply be realized with such an arrangement since the response axis of a longitudinal accelerometer adapted for producing a signal component proportional to the acceleration Z in the direction of the yaw axis, is inclined with respect to the aircraft roll axis in a plane containing the roll axis and the yaw axis of the aircraft. The longitudinal accelerometer then supplies a signal component D corresponding to the longitudinal acceleration in the direction of the aircraft axis. This component is superimposed on the $\Delta v$-signal for gust compensation as disclosed in the above-referred-to application. However, at the same time, the accelerometer supplies a component $\dot{Z}$ which is proportional to the acceleration in the direction of the aircraft yaw axis and which is employed to effect a decoupling of the control loops at the input of the speed controller in the manner as described.

A signal is applied to the longitudinal accelerometer signal channel for the compensation of a gravity acceleration component which, due to the inclination of the accelerometer, acts thereon. Further, a signal obtained from a vertical gyro of the aircraft is applied to the signal channel of the acceleration signal for compensation of a gravity acceleration component acting on the accelerometer due to the pitch angle $\tau$ of the aircraft.

Means are provided to ensure that the speed controller does not by a change in thrust counteract an intended change in the flight path controlled by the pilot via the elevator. In further modification of the invention, a signal proportional to the air speed and to the angular velocity $\omega$ about the pitch axis is connected in opposition to the accelerometer signal component which is proportional to the acceleration in the direction of the yaw axis in a manner for compensating the centrifugal accelerations occurring with intended changes in the path. When the aircraft deviates from the specified gliding path, as for instance when it enters a region of downward air currents, it does not change its attitude. The angular velocity signal at this time is zero and the acceleration $d^2h/dt^2$ controls the speed controller in the manner as described. However, when a desired change in path is controlled by means of elevator, this change in path results in a change of the pitch angle, a signal is generated, and this $\tau$ signal prevents the speed controller from responding. As indicated above a pitch angle signal obtained from the vertical gyro is applied to the channel of the accelerometer, for the compensation of the gravity component, occuring due to the pitch angle of the aircraft. A signal corresponding to the angular velocity about the pitch axis can be obtained very simply in that the pitch angle signal obtained from the vertical gyro is applied to the channel of the acceleration signal via a PD-amplifier described hereinafter.

In turn flight, centrifugal components occur in the direction of the aircraft yaw axis. In order to avoid an undesired response of the speed controller during turn flight, a signal, $$\frac{1}{\cos \rho}$$

which is inversely proportional to the cosine of the aircraft roll angle $\rho$ is applied to the channel of the acceleration signal for the compensation of centrifugal forces. This compensation may be conveniently accomplished by obtaining from the vertical gyro a roll angle compensating signal proportional to $1-\cos \rho$ as an approximation for $$\frac{1}{\cos \rho}-1$$

Due to the small roll angles occuring here, $$\frac{1}{\cos \rho}-1$$

can be expressed with sufficient approximation by $1-\cos \rho$. A signal proportional to $1-\cos \rho$ is picked off at conventional vertical gyros.

Referring to FIG. 1, a substantial decoupling of the control loops which are intercoupled so as to resemble a figure "8"-shaped network for the gliding angle $\gamma$ and the speed $v$, is provided by the application to the speed controller 13 of a signal proportional to $d^2h/dt^2$. The source of the $d^2h/dt^2$ signal is represented by the differentiation element 17. In practice, the acceleration is measured directly, as is shown in FIG. 2.

Figure 2:
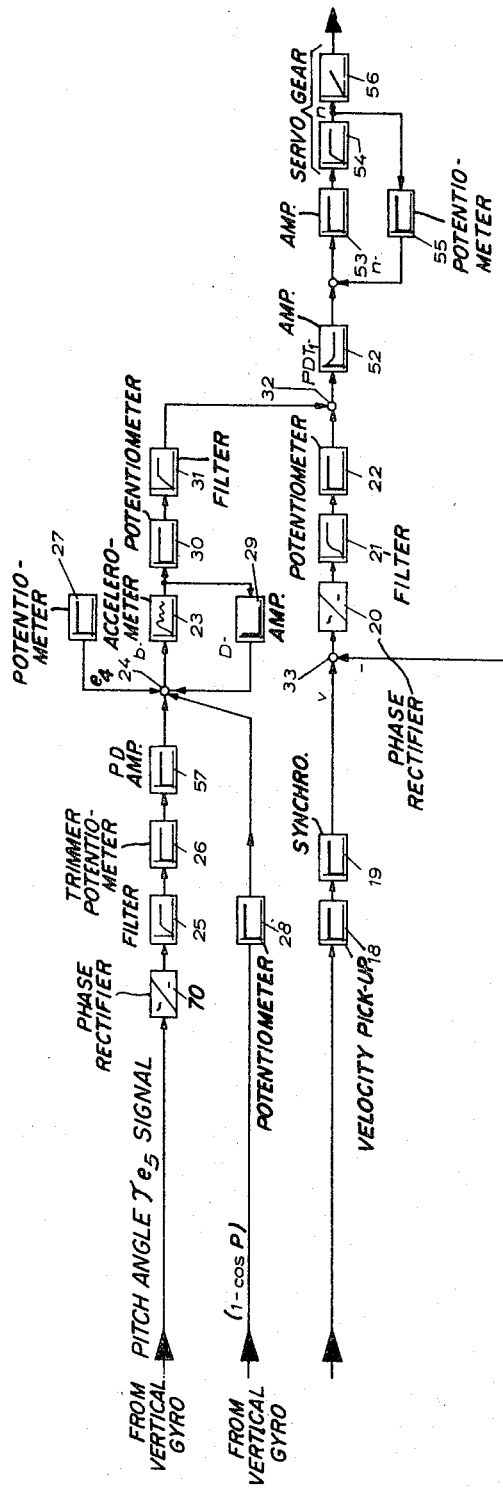
FIG. 2 is a diagram in block form of a speed controller constructed in accordance with features of the present invention.
Figure 2:
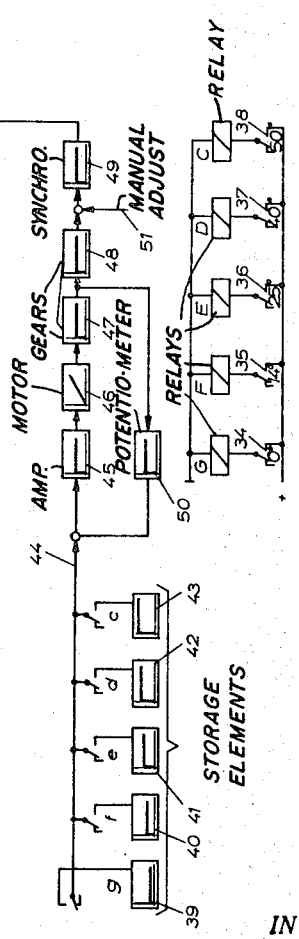

In FIG. 2, the speed controller according to the invention, on the one hand, is controlled by the velocity head which is measured by means of a pressure element 18. The pressure element is tapped by means of a synchro which provides a signal proportional to the aircraft speed with respect to air. This signal is converted into a D.C. signal by a phase rectifier 20 and a filter 21, and is applied across a potentiometer 22. The potentiometer 22 serves to adjust the controller.

The acceleration which is measured by means of an accelerometer 23 (FIG. 3) serves as further signal for application to the speed controller. The accelerometer 23 having a response axis thereof is somewhat inclined with respect to the roll axis of the aircraft in a plane containing the yaw axis and the roll axis of the aircraft. Therefore, it supplies a signal component D proportional to the longitudinal acceleration and a signal component $\ddot{Z}$ proportional to the acceleration in the direction of the yaw axis. The accelerometer 23 has a compensation coil whereby additional forces can be applied to the mass of the accelerometer. This compensation coil primarily serves to compensate gravity acceleration. U.S. Pat. No. 2,853,287 illustrates an exemplary accelerometer having a compensation coil which is referred to in this patent as the stator winding of a torque generator section of the accelerometer. The torque generator exerts a restraint on the seismic mass. For this purpose, the compensation coil which is represented herein by the summing point 24 (FIG. 2) has applied thereto, a signal in response to the pitch angle $\tau$. This signal is obtained from the vertical gyro by means of a synchro and is converted by a phase rectifier 70 and a filter 25 into a corresponding D.C. signal. By means of a trimmer-potentiometer 26 the intensity of this $\tau$-compensation signal can be adjusted so that the gravity acceleration caused by the pitch angle of the aircraft is compensated. This signal is supplied to the compensation coil of the accelerometer 23 via a PD-amplifier 57, the PD-amplifier transmits the signal differentiated and proportionally. That is, in addition to a component proportional to $\tau$, a component proportional to the angular velocity $\omega$ about the pitch axis is obtained. This component compensates the centrifugal accelerations which occur in the vertical plane (drawing or pushing) with a change in path initiated intentionally by the elevator, so that these do not influence the speed controller and do not disturb the initiated maneuver.

Another signal is supplied to the compensation coil for compensating the component of the gravity acceleration which becomes effective due to the inclination of the response axis of the accelerometer with respect to the aircraft roll axis at the pitch angle $\tau=0$. This compensation signal is obtained from a potentiometer 27.

In addition, there is obtained a signal from the vertical gyro, which is proportional to $1-\cos, \rho$, $\rho$ being the roll angle of in turn flight. For relatively small angles $\rho$, as are generally involved in practice, this is a good approximation for the actually required value $$\frac{1}{\cos \rho}-1$$

A signal $1-\cos \rho$ can be picked off at the conventional vertical gyros. This signal is also supplied to the correction coil of the accelerometer 23 via a potentiometer 28, whereby in turn flight the component in the direction of the yaw axis, of the centrifugal acceleration is compensated. These compensation signals are applied as input signals I to the stator winding of the torque generator in the referred-to patent, for example.

The output signal of the accelerometer is also supplied to the compensation coil of the accelerometer 23 via a differentiating amplifier 29 and effects an electric damping. The output signal of the accelerometer is then superimposed on the signal of the potentiometer 22 as at 32 via a potentiometer 30 and a filter 31. The potentiometer 30 serves to adjust the controller and determines the intensity of the acceleration intrusion.

The predetermined value $w_1$ of the aircraft speed with respect to air is connected in opposition to the signal from the synchro 19 as at 33. It is normally determined by the position of the landing flaps. When lowering the landing flaps to 14°, 25° 40°, and 50°, the switches 35, 36, 37 and 38, respectively, are closed. In the landing flap position 0° the switch 34 is closed. Relays G, F, E, D, and C are energized via switches 34 to 38. The contacts g, f, e, d and c thereof connect one predetermined value storage element each 39 to 43 to a predetermined value input 44. The storage elements 39 to 43 may be accordingly adjusted potentiometers across which a voltage representing the predetermined value is picked off. The voltage picked off across the predetermined value storage element controls a motor 46 via an amplifier 45. The latter adjusts a synchro 49 via a gear mechanism 47 and a further gear mechanism 48. The position repeat-back is effected via a potentiometer 50 adjusted by the output side of the gear mechanism 47, so that the synchro 49 is adjusted by a path proportional to the voltage stored in the storage element 39, etc. The synchro 49 may also be adjusted manually, as is illustrated as at 51. The output signal of the synchro is mixed with the output signal of the synchro 19 as predetermined value of the air speed in phase opposition. An A.C. signal will then occur at the phase rectifier 20, corresponding to the error $\Delta v$ according to amplitude and phase. This $\Delta v$-signal after rectification and smoothing is added to the acceleration signal from the accelerometer 23. The latter contains a component corresponding to the longitudinal acceleration of the aircraft. It serves for gust compensation and, as will be described hereinafter, for producing a D component in the speed control. The acceleration signal from the accelerometer further contains a component $\ddot{Z}$ which corresponds to the acceleration in the direction of the yaw axis and serves for the decoupling of the control loops of FIG. 1. The sum signal obtained at 32 is amplified via a $PDT_1$ amplifier 52, that is, an amplifier which transmits the signal differentiated and proportionally with a delay T, as is indicated by the plotted transfer function. The signal thus obtained controls a servomotor 54 via a main amplifier 53 with a speed negative feedback 55. The speed negative feedback is effective to cause a rotation of the motor 54 which is strictly proportional to the input signal. The motor 54 adjusts the gas throttle via a gear mechanism 56. The motor 54 acts as integrating element and the path of adjustment of the gas throttle is proportional to the integral of the input signal supplied to the amplifier 53. This input signal contains a proportionally and differentiatedly transmitted portion from the sum signal which is produced as at 32. The D-portion of the longitudinal acceleration signal $db/dt$ after integration by motor 54 results in a D component of speed. The proportionally transmitted longitudinal acceleration signal and the differentiatedly transmitted $\Delta v$-signal after integration by the motor 54 result in a P-portion for the speed control, and the $\Delta v$-signal transmitted proportionally by the amplifier 52 is integrated and supplies an I-portion. Thus, a PID-control is obtained.

The desired predetermined speeds are adjusted in the storage elements 39 to 43 for the different landing flap positions in accordance with the provided gliding course and the required landing speed. These predetermined values, upon lowering of the landing flaps, are successively preset as at 33, and by a change in thrust the speed is controlled to these values. When there is a deviation from a predetermined gliding path which becomes effective as acceleration in the direction of the yaw axis, via the corresponding signal component of the accelerometer there is also effected an adjustment of the gas throttle, as had been explained hereinbefore in connection with FIG. 1.

While there has been illustrated and described particular embodiments of my invention, it will be understood that various modifications may be made therein without departing from the spirit of the invention.

What I claim is:
1. In an aircraft having yaw, pitch and roll axes and having propulsion units, a flight control comprising:
   speed control means for automatically altering the thrust of a propulsive unit in response to an input control signal;
   means providing an electrical input control signal $\Delta v$, which is proportional to a deviation in aircraft airspeed from a preselected airspeed and for applying said signal to said speed control means; and
   means for providing an electrical input control signal $\ddot{Z}$ which is proportional to the acceleration of the aircraft in the direction of its yaw axis and for applying said signal to said speed control means for increasing or decreasing the thrust of said propulsion unit in order to compensate for deviations from a desired flight path.

2. The flight controller of claim 1 including automatic pilot means for maintaining the aircraft in a selected flight path.

3. The flight controller of claim 2 wherein said means for providing and applying a signal $\ddot{Z}$ to said speed control means includes an accelerometer adapted for generating the signal $\ddot{Z}$ and for generating a signal D which is proportional to acceleration of the aircraft along a longitudinal axis.

4. The flight controller of claim 2 wherein said means for providing a signal $\ddot{Z}$ comprises an accelerometer having a response axis extending in a plane formed by the aircraft roll and yaw axes and is inclined with respect to the roll axis.

5. The flight controller of claim 4 including means for applying to the signal channel of the accelerometer signal a signal $e_4$ for compensating for a gravity acceleration component due to the inclination of the accelerometer.

6. The flight controller of claim 4 including means for generating and applying to the signal channel of the acceleration signal, a signal $e_5$ for compensating for a gravity acceleration component acting on the accelerometer due to the pitch angle $\tau$ of the aircraft.

7. The flight controller of claim 4 including means for providing and coupling a signal proportional to the angular velocity of the aircraft about the pitch axis in opposition to the signal $\ddot{Z}$ in a manner for compensating for centrifugal accelerations occurring with selected changes in flight path.

8. The aircraft speed controller of claim 6 wherein said means for generating said signal ($e_5$) comprises a vertical gyroscope and said signal ($e_5$) is applied to the channel of the acceleration signal by a differentiating amplifying means.

9. The aircraft speed controller of claim 6 including means for generating and coupling a signal 1/cos $\rho$ which is inversely proportional to the cosine of the aircraft roll angle $\rho$ to the channel of the acceleration signal for the compensation of centrifugal forces in turn flight.

10. A speed controller as claimed in claim 9, including a vertical gyroscope and wherein a signal proportional to 1—cos $\rho$ is derived from the vertical gyroscope for roll angle compensation.

11. In the aircraft of claim 1, said propulsion units supported on the aircraft at a position with respect to the center of gravity of the aircraft so that a variation in the aircraft speed or attitude causes a corresponding undesirable change in the aircraft attitude and speed respectively, the improvement comprising an accelerometer positioned in the aircraft for measuring variations in longitudinal acceleration and acceleration substantially in the direction of the yaw axis of the aircraft and for generating an electrical signal representative of variations in the acceleration of the aircraft in the direction of the yaw axis, and, means for coupling said signal to the automatic speed control means for causing an increase or decrease in the thrust of the propulsion units in order to compensate for deviations from a desired flight path.

References Cited

UNITED STATES PATENTS

| | | | |
|---|---|---|---|
| 2,875,965 | 3/1959 | Anderson et al. | 244—77 |
| 2,932,472 | 4/1960 | Gaynor et al. | 244—77 |
| 2,948,496 | 8/1960 | Joline | 244—77 |

TRYGVE M. BLIX, Primary Examiner

J. L. FORMAN, Assistant Examiner